United States Patent [19]
Katz et al.

[11] 3,773,524
[45] Nov. 20, 1973

[54] FLAVORING COMPOSITIONS AND PROCESSES UTILIZING ALPHA-KETOTHIOLS

[75] Inventors: Ira Katz, Elberon; William J. Evers, Atlantic Highlands; Anne Sanderson, Highlands, all of N.J.

[73] Assignee: International Flavors & Fragrances Inc., New York, N.Y.

[22] Filed: July 12, 1971

[21] Appl. No.: 162,008

[52] U.S. Cl............... 426/65, 260/593 R, 426/364, 426/175
[51] Int. Cl................................................ A23l 1/26
[58] Field of Search................ 99/140 R; 260/593 R

[56] References Cited
UNITED STATES PATENTS
3,394,015  7/1968  Giacino........................... 99/140 R
FOREIGN PATENTS OR APPLICATIONS
1,156,486  6/1969  Great Britain

OTHER PUBLICATIONS

Asinger et al. Chemical Abstracts 61:1859(d) (1964).

Primary Examiner—Morris O. Wolk
Assistant Examiner—Sidney Marantz
Attorney—Lorimer P. Brooks et al.

[57] ABSTRACT

The use of certain α-Ketothiols of the formula

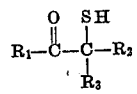

wherein $R_1$ is methyl or ethyl and $R_2$ and $R_3$ are hydrogen, methyl or ethyl to alter the meat flavor and aroma of foodstuffs.

8 Claims, No Drawings

FLAVORING COMPOSITIONS AND PROCESSES UTILIZING ALPHA-KETOTHIOLS

This invention concerns the use of certain α-ketothiols to alter the flavor and aroma of foodstuffs.

The term "foodstuff" as used herein includes both solid and liquid ingestible materials for man or animals, which materials usually do, but need not, have nutritional value. Thus, foodstuffs include meats, gravies, soups, convenience foods, malt and other alcoholic or non-alcoholic beverages, milk and dairy products, nut butters such as peanut butter and other spreads, seafoods, including fish, crustaceans, molluscs, and the like, candies, breakfast foods, baked goods, vegetables, cereals, soft drinks, snack foods, dog and cat foods, other veterinary products, and the like.

The term "alter" in its various forms will be understood herein to mean the supplying or imparting a flavor character or note to an otherwise bland, relatively tasteless substance, or augmenting an existing flavor characteristic where the natural flavor is deficient in some regard, or supplementing the existing flavor impression to modify organoleptic character.

There is a continuing search for compositions which can vary, fortify, modify, enhance or otherwise improve (i.e. "alter") the flavor and aroma of a foodstuff. To be satisfactory, such compositions should be stable, non-toxic, and blendable with other ingredients to provide its own unique flavor and aroma nuance without detracting from the co-ingredients. Preferably, such compositions should be naturally occurring or present in natural foodstuffs (although unrecognized as a flavor component thereof) so that its ingestible safety can be readily recognized. Additionally, these materials should be capable of being synthesized in a simple and economic manner.

While the various α-ketothiols of this invention are old compounds which synthesis has been described in the literature (see, e.g. Chem. Abstracts, 61: 1859d (1964), no one has previously recognized or discovered that these compounds are useful flavoring materials. The art (Badings, J. Dairy Science, 50, No. 9, pp. 1,347 et seq. (1967)) has noted that β-ketothiols, namely 2-mercapto-2-methyl-pentan-4-one, is the cause of an off-flavor in cheese.

It has now been found that the flavor of foodstuff can be altered by adding thereto a small but effective amount of at least one α-ketothiol having the formula

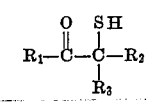

wherein $R_1$ is methyl or ethyl and $R_2$ and $R_3$ are hydrogen, methyl or ethyl. It is generally preferred that $R_3$ be hydrogen and $R_2$ be methyl. The invention also contemplates flavoring composition containing such α-ketothiols.

Suitable α-ketothiols include
2-mercapto-3-pentanone
2-mercapto-3-butanone
2-mercapto-2-methyl-3-butanone
2-mercapto-2-methyl-3-pentanone
2-mercapto-2-ethyl-3-butanone
2-mercapto-2-ethyl-3-pentanone The α-ketothiols of this invention having a strong aroma and taste agreeably resembling that of meat. The compound 2-mercapto-3-butanone has been found by applicants in the volatile components of a meat flavor composition obtained by heating a protein hydrolysate, cysteine, and thiamine.

Such a α-ketothiols are accordingly useful in flavoring compositions. Such a composition is taken to mean one which contributes a part of the overall flavor impression by supplementing or fortifying a natural or artifical flavor in a material, as well as one which supplies substantially all of the flavor and/or aroma character to a consumable article. The α-ketothiols of this invention are particularly suitable for rounding out and improving the character of meat flavor compositions.

When the α-ketothiols according to this invention are used in a flavoring composition, they can be combined with conventional flavoring materials or adjuvants. Such co-ingredients or flavoring adjuvants are well known in the art for such use and have been extensively described in the literature. Apart from the requirement that any such adjuvant material be ingestibly acceptable, and thus non-toxic or otherwise non-deleterious, conventional materials can be used and broadly include other flavor materials, vehicles, stabilizers, thickeners, surface active agents, conditioners, and flavor intensifiers.

Such conventional flavoring materials include saturated and unsaturated amino and fatty acids, alcohols, including primary and secondary alcohols; esters; carbonyl compounds including ketones and aldehydes; lactones; other cyclic organic materials including benzene derivatives, alicyclics, heterocyclics such as furans, pyridines, pyrazines and the like; sulfur-containing materials including thiols, sulfides, disulfides and the like; proteins, lipids; carbohydrates; so-called flavor potentiators such as monosodium glutamate, guanylates, and inosinates; natural flavoring materials such as cocoa, vanilla, and caramel; essential oils and extracts such as anise oil, clove oil and the like; artificial flavoring materials such as vanillin; and the like. Particularly suitable flavoring agent adjuvants are protein hydrolysate, cystein, thiamine, and reaction products of one or more of them.

Stabilizers include preservatives such as sodium chloride, and the like, antioxidants such as calcium and sodium ascorbate, ascorbic acid, butylated hydroxyanisole, butylated hydroxytoluene, propyl gallate and the like, sequestrants such as citric acid, EDTA, phosphates, and the like.

Thickeners include carriers, binders, protective colloids, suspending agents-emulsifiers and the like, such as agar-agar, carrageenan, cellulose and cellulose derivatives such as carboxymethyl cellulose and methyl cellulose, natural and synthetic gums such as gum arabic, gum tragacanth and the like, and other proteinaceous materials, lipids, carbohydrates, starches and pectins.

Surface active agents include emulsifying agents such as mono- and/or diglycerides of fatty acids such as caproic acid, caprylic acid, palmitic acid, myristic acid, oleic acid, and the like, lecithin, defoaming and flavor-dispersing agents such as sorbitan monostearate, potassium stearate, hydrogenated tallow alcohol, and the like.

Conditioners include compounds such as bleaching and maturing agents such as benzoyl peroxide, calcium peroxide, hydrogen peroxide and the like; starch modifiers such as peracetic acid, sodium chlorite, sodium hypochlorite, propylene oxide, succinic anhydride and the like, buffers and neutralizing agents such as sodium acetate, ammonium bicarbonate, ammonium phosphate, citric acid, lactic acid, vinegar and the like; colorants such as carminic acid, cochineal, turmeric, curcumin, approved food and drug dyes, and the like; firming agents such as aluminum sodium sulfate, calcium chloride and calcium gluconate; texturizers; anticaking agents such as aluminum calcium sulfate and tribasic calcium phosphate; enzymes; yeast foods such as calcium lactate and calcium sulfate; nutrient supplements such as iron salts, such as ferric phosphate, ferric pyrophosphate, ferrous gluconate and the like, riboflavin, vitamins, zinc sources such as zinc chloride, zinc sulfate, and the like.

The $\alpha$-ketothiols, or the compositions incorporating them, as mentioned above, can be combined with one or more vehicles or carriers for adding them to the particular product. Vehicles can be edible or otherwise suitable materials such as ethyl alcohol, propylene glycol, water, and the like. Carriers include materials such as gum arabic, carrageenan, other gums, and the like. The $\alpha$-ketothiols can be incorporated with the carriers by conventional means such as spray-drying, drum-drying, and the like. Such carriers can also include materials for coacervating the $\alpha$-ketothiols (and other flavoring ingredients, as present) to provide encapsulated products. When the carrier is an emulsion, the flavoring composition can also contain emulsifiers such as mono-and diglycerides of fatty acids and the like. With these carriers or vehicles, the desired physical form of the composition can be prepared.

It will be understood by those skilled in the art that the $\alpha$-ketothiols can be added to the materials to be flavored at any convenient point in the production of the finished product. Thus, when the $\alpha$-ketothiols are used to alter the flavor of a foodstuff, they can be added in the original mixture, dough, emulsion, batter, or the like prior to any cooking or heating operation. Alternatively, they can be added at a later stage of processing if volatilization losses would be excessive during the earlier processing.

The quantity of $\alpha$-ketothiols or mixtures thereof utilized should be sufficient to impart the desired flavor characteristic to the product but on the other hand, the use of an excessive amount of the $\alpha$-ketothiols is not only wasteful and uneconomical but in some instances too large a quantity may unbalance the flavor or other organoleptic property of the product consumed. The quantity used will vary depending upon the ultimate foodstuff, or other consumable product; the amount and type of flavor initially present in the product; the further process or treatment steps to which the product will be subjected; regional and other preference factors; the type of storage, if any, to which the product will be subjected; and the preconsumption treatment, such as baking, frying, and so on, given to the product by the ultimate consumer. Accordingly, the terminology "effective amount" and "sufficient amount" is understood in the context of the present invention to be quantitatively adequate to alter the flavor of the foodstuff.

It is preferred that the ultimate compositions contain from about 0.001 part per million (ppm) to about 10 ppm of $\alpha$-ketothiols. More particularly, in meat or simulated meat-like food compositions it is desirable to use from about 0.003 to about 0.1 ppm for enhancing flavors and in certain preferred embodiments of the invention, from about 0.01 to about 10 ppm of the $\alpha$-ketothiols are included to add positive flavors to the finished product.

All parts, proportions, percentages, and ratios herein are by weight unless otherwise indicated.

The amount of $\alpha$-ketothiols to be utilized in flavoring composition can be varied over a wide range depending upon the particular quality to be added to the foodstuff or other consumable material. Thus, amounts of one or more $\alpha$-ketothiols according to the present invention from about 0.1 percent up to 80 or 90 percent can be incorporated in such compositions. It is generally found to be desirable to include from about 0.5 to about 25 percent of the $\alpha$-ketothiols in such compositions.

It will be appreciated from the present disclosure that the $\alpha$-ketothiols and mixtures thereof according to the present invention can be used to alter, vary fortify, modify, enhance, or otherwise improve the flavor of a wide variety of materials which are ingested, consumed, or otherwise organoleptically sensed.

The following examples are given to illustrate embodiments of the invention as it is presently preferred to practice it. It will be understood that these examples are illustrative, and the invention is not to be considered as restricted thereto except as indicated in the appended claims.

EXAMPLE I

The following are homogeneously admixed at 25°C:

| INGREDIENTS | PARTS |
|---|---|
| Vegetable shortening | 622.7 |
| Salt | 321.7 |
| Glutamic acid | 5.1 |
| L-Cysteine Hydrochloride | 10.3 |
| Glycine | 5.1 |
| $\beta$-Alanine | 1.3 |
| Taurine | 20.0 |
| Mixture of di-sodium inosinate and di-sodium guanylate | 3.3 |
| 2-Mercapto-3-pentanone | 0.10 |

This mixture is heated to 300° F for 30 seconds. After cooling to 100° F, 0.12 part of diacetyl and 0.10 part of hexanal are added. The resulting mixture has an excellent chicken aroma.

EXAMPLE II

The following materials are homogeneously mixed at 25° C:

| INGREDIENTS | PARTS |
|---|---|
| Vegetable shortening | 622.7 |
| Salt | 321.7 |
| Glutamic acid | 5.1 |
| L-Cysteine hydrochloride | 10.3 |
| Glycine | 5.1 |
| $\beta$-Alanine | 1.3 |
| Taurine | 20.0 |
| Mixture of di-sodium inosinate and di-sodium guanylate | 3.3 |

The mixture is heated at 300° F for 30 seconds. After cooling to 100° F, 0.12 part of diacetyl and 0.10 part of hexanal are added. After aging the resulting mixture for three hours 0.1 part of 2-mercapto-3-pentanone is added.

The resulting mixture is aged for 10 hours to provide a material having an excellent chicken aroma.

EXAMPLE III

| INGREDIENTS | PARTS |
|---|---|
| Vegetable shortening | 622.7 |
| Salt | 321.7 |
| Glutamic acid | 5.1 |
| L-Cysteine hydrochloride | 10.3 |
| β-Alanine | 1.3 |
| Taurine | 20.0 |
| Mixture of di-sodium inosinate and di-sodium guanylate | 3.3 |

The mixture is heated at 300° F for 30 seconds. After cooling to 100° F, 0.12 part of diacetyl and 0.10 part of hexanal are added. After aging the resulting mixture for three hours 0.1 part of 2-mercapto-3-butanone is added.

The resulting mixture is aged for 10 hours to provide a material having an excellent chicken aroma.

EXAMPLE IV

| INGREDIENTS | PARTS |
|---|---|
| Vegetable shortening | 622.7 |
| Salt | 321.7 |
| Glutamic acid | 5.1 |
| L-Cysteine hydrochloride | 10.3 |
| β-Alanine | 1.3 |
| Taurine | 20.0 |
| Mixture of di-sodium inosinate and di-sodium guanylate | 3.3 |
| 2-Mercapto-3-butanone | 0.05 |
| 2-Mercapto-3-pentanone | 0.05 |

The resulting mixture has an excellent chicken aroma.

EXAMPLE V

The following ingredients are homogeneously mixed at 25° C:

| INGREDIENTS | PARTS |
|---|---|
| Vegetable shortening | 622.7 |
| Salt | 321.7 |
| Glutamic acid | 5.1 |
| L-Cysteine hydrochloride | 10.3 |
| Glycine | 5.1 |
| β-Alanine | 1.3 |
| Taurine | 20.0 |
| Mixture of di-sodium inosinate and di-sodium guanylate | 3.3 |

The mixture is heated to 300° F for 30 seconds. After cooling to 100° F, 0.12 part of diacetyl, 0.10 part of hexanal, and 0.1 part of 2-mercapto-3-butanone are added.

The resulting mixture has an excellent chicken aroma.

EXAMPLE VI

The following ingredients are homogeneously mixed at 25° C:

| INGREDIENTS | PARTS |
|---|---|
| Vegetable shortening | 622.7 |
| Salt | 321.7 |
| Glutamic acid | 5.1 |
| L-Cysteine hydrochloride | 10.3 |
| Glycine | 5.1 |
| β-Alanine | 1.3 |
| Taurine | 20.0 |
| Mixture of di-sodium inosinate and di-sodium guanylate | 2.0 |

The mixture is heated to 300° F for 60 seconds. After cooling to 100° F, 0.12 part of diacetyl and 0.10 part of hexanal are added. After aging the mixture for a period of 3 hours at a temperature of 65° F, 0.05 2-mercapto-3-butanone are added. The resulting mixture is then aged for 10 hours to yield a composition having an excellent chicken aroma and flavor.

EXAMPLE VII a. Cysteine hydrochloride in the amount of 8.8 g is refluxed at 215° F under atmospheric pressure for 4 hours with a mixture of 309 g of hydrolyzed vegetable protein, 8.8 g thiamine Hcl, and 674 g of water. Subsequent to the reflux, the mixture is cooled and 0.05 g 2-mercapto-3-pentanone is added and intimately admixed with the composition. The mixture has an excellent beef flavor.

b. The beef flavor produced in Example VII (a) is added to:
1. a commercial dry type pet food;
2. a semi-moist type pet food; and
3. wet or canned pet food.

When so added at levels of 0.5 percent, 1 percent, 1.5 percent, 2 percent, 2.5 percent and 3 percent (by weight of foodstuff) highly palatable pet foods are obtained.

EXAMPLE VIII

The composition prepared in Example I is dissolved in propylene glycol to provide a 0.1 percent solution. This solution in the amount of 0.966 g is added to 7.3 g of a soup base consisting of:

| INGREDIENTS | PARTS |
|---|---|
| Fine ground sodium chloride | 35.62 |
| Hydrolyzed vegetable protein | 27.40 |
| Monosodium glutamate | 17.81 |
| Sucrose | 10.96 |
| Beef fat | 5.48 |
| Sethness caramel color (powder B&C) | 2.73 |

The composition of Example II (0.005 g) when added to the above soup base also provides a soup having good meat flavor.

EXAMPLE IX

The composition prepared in Example VI is dissolved in propylene glycol to provide a 0.1 percent solution. This solution in the amount of 0.966 g is added to 7.3 g of a soup base consisting of:

| INGREDIENTS | PARTS |
|---|---|
| Fine ground sodium chloride | 35.62 |
| Hydrolyzed vegetable protein (Maggi 4BE) | 27.40 |
| Monosodium glutamate | 17.81 |
| Sucrose | 10.96 |
| Beef fat | 5.48 |
| Sethness caramel color (powder B&C) | 2.73 |

The resulting mixture is added to 12 ounces of boiling water to obtain a soup having an excellent chicken flavor.

The composition of Example III (0.005 g) when added to the above soup base also provides a soup having good meat flavor.

What is claimed is:

1. A process for altering the meat or poultry flavor of a foodstuff which comprises adding, other than that which may be obtained by reacting a protein hydrolysate, cysteine and thiamine, to a foodstuff a small but effective amount as the essential ingredient of an α-ketothiol having the formula

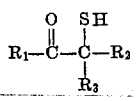

wherein $R_1$ is methyl or ethyl, and $R_2$ and $R_3$ are hydrogen, methyl or ehtyl.

2. A process as claimed in claim 1 wherein $R_3$ is hydrogen and $R_2$ is methyl.

3. A process as claimed in claim 1 wherein $R_1$ is methyl, $R_2$ is methyl and $R_3$ is hydrogen 4. A process as claimed in claim 1 wherein $R_1$ is ethyl, $R_2$ is methyl and $R_3$ is hydrogen.

5. A flavoring composition adapted to alter the meat or poultry flavor of a foodstuff containing as the essential ingredient an α-ketothiol, other than that which may be obtained by reacting a protein hydrolysate, cysteine and thiamine, having the formula

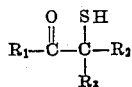

wherein $R_1$ is methyl or ethyl, and $R_2$ and $R_3$ are hydrogen, methyl or ethyl, and an auxiliary flavoring adjuvant.

6. A flavoring composition as defined in claim 5 wherein $R_3$ is hydrogen and $R_2$ is methyl.

7. A flavoring composition as defined in claim 5 wherein $R_1$ is methyl, $R_2$ is methyl and $R_3$ is hydrogen.

8. A flavoring composition as defined in claim 5 wherein $R_1$ is ethyl, $R_2$ is methyl, and $R_3$ is hydrogen.

* * * * *